(12) United States Patent
Chang et al.

(10) Patent No.: US 10,566,642 B2
(45) Date of Patent: Feb. 18, 2020

(54) SEDIMENT TYPE MICROBIAL FUEL CELL (71) Applicant: GWANGJU INSTITUTE OF SCIENCE AND TECHNOLOGY, Gwangju (KR)

(72) Inventors: In Seop Chang, Gwangju (KR); Bong Kyu Kim, Gwangju (KR); Yoo Seok Lee, Gwangju (KR); Hyun Jun Park, Gwangju (KR); Ji Su Kim, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 471 days.

(21) Appl. No.: 15/320,262

(22) PCT Filed: Feb. 23, 2015

(86) PCT No.: PCT/KR2015/001687
§ 371 (c)(1),
(2) Date: Dec. 19, 2016

(87) PCT Pub. No.: WO2015/194736
PCT Pub. Date: Dec. 23, 2015

(65) Prior Publication Data
US 2017/0162897 A1 Jun. 8, 2017

(30) Foreign Application Priority Data
Jun. 17, 2014 (KR) .................. 10-2014-0073798

(51) Int. Cl.
*H01M 8/16* (2006.01)
*H01M 8/0289* (2016.01)
*H01M 8/02* (2016.01)

(52) U.S. Cl.
CPC ............. *H01M 8/16* (2013.01); *H01M 8/02* (2013.01); *H01M 8/0289* (2013.01); *Y02E 60/527* (2013.01)

(58) Field of Classification Search
None
See application file for complete search history.

(56) References Cited

U.S. PATENT DOCUMENTS

| 2010/0081014 A1 | 4/2010 | Tyce et al. |
| 2012/0070696 A1 | 3/2012 | Jin et al. |
| 2013/0299400 A1* | 11/2013 | Silver ............. C02F 3/005 210/150 |

FOREIGN PATENT DOCUMENTS

| JP | 2007-287413 A | 11/2007 |
| KR | 10-0911658 B1 | 8/2009 |
| KR | 10-2010-0137766 A | 12/2010 |

OTHER PUBLICATIONS

International Search Report dated Apr. 10, 2015 corresponding to International Application PCT/KR2015/001687.

* cited by examiner

Primary Examiner — Wyatt P McConnell
(74) Attorney, Agent, or Firm — Hauptman Ham, LLP

(57) ABSTRACT

A sediment microbial fuel cell is provided. More specifically, the present invention provides a sediment microbial fuel cell characterized by comprising: an oxide electrode unit located within the sediment of polluted water; a reduction electrode unit located adjacent to the water surface within the water; and a solid matter separator unit arranged inside the sediment and located in an upper part of the oxide electrode unit spaced apart from the oxide electrode unit, wherein one or more surfaces of the oxide electrode unit are exposed in the separation space formed by the solid matter separator unit.

7 Claims, 7 Drawing Sheets

SEDIMENT TYPE MICROBIAL FUEL CELL

CROSS REFERENCE TO RELATED APPLICATION

This application claims the benefit of Korean Patent Application No. 10-2014-0073798, filed on Jun. 17, 2014, entitled "SEDIMENT TYPE MICROBIAL FUEL CELL", which is hereby incorporated by reference in its entirety into this application. Further, this application is the National Phase application of International Application No. PCT/KR2015/001687, filed Feb. 23, 2015, which designated the United States and was published in Korean. Both of the priority documents are hereby incorporated by reference in their entireties.

TECHNICAL FIELD

The present invention relates to a microbial fuel cell, and, more particularly, to a sediment-type microbial fuel cell including a solid matter separator unit.

BACKGROUND ART

A microbial fuel cell (MFC) refers to an apparatus which can directly convert chemical energy of organic matter into electric energy using microbes capable of extracellularly transferring electrons, among anaerobic microbes feeding on organic matter. Particularly, a sediment-type microbial fuel cell can convert chemical energy stored in organic sediment dissolved in water (for example, a sea, a river, a lake) into electric energy using bacteria living in nature, and various research is being conducted to use the sediment-type microbial fuel cell as an apparatus for improving water quality of a body of water including a lake, a waste water treatment plant, and the like or for long-term monitoring of a marine environment.

Generally, a sediment-type microbial fuel cell has a structure in which an anode is placed in sediment and a cathode is placed close to an air space, such that electrons generated upon decomposition of organic matter in the sediment by underwater microbes can be transferred between the electrodes to activate the fuel cell. Such a sediment-type microbial fuel cell can produce electric energy using resources existing in nature and thus is eco-friendly and can be used for a long time without the need for addition of separate organic matter so long as the fuel cell is installed in a body of water containing organic sediment.

However, a typical sediment-type microbial fuel cell has problems in that a mass transfer rate at which organic matter is diffused around electrodes is low due to low molecular diffusion coefficient in sediment, causing a limitation in reduction in power output and current density of the fuel cell, and growth of microbes around the anode is likely to be inhibited due to oxygen crossover from a cathode to an anode caused by layout of the electrodes.

DISCLOSURE

Technical Problem

It is an aspect of the present invention to provide a sediment-type microbial fuel cell which can minimize oxygen crossover while increasing organic matter transfer rate.

Technical Solution

In accordance with an aspect of the present invention, there is provided a sediment-type microbial fuel cell, including: an anode module placed in sediment of a contaminated region of water; a solid matter separator unit placed in the sediment to be disposed above the anode module; and a cathode module placed underwater to be adjacent to a water surface, wherein at least one surface of the anode module is exposed to a space formed by the solid matter separator unit.

A liquid-phase material originating from the contaminated region of water may be present in the space.

The sediment of the contaminated region of water may be divided by the solid matter separator unit to have a sandwich structure of a lower sediment, the space, and an upper sediment.

The sandwich structure may provide a concentration gradient of organic matter formed from the upper sediment to the space.

The anode module may include an anode and an anode support connected to the anode.

The cathode module may include a cathode and a cathode support connected to the cathode.

Each of the anode and the cathode may be formed of a graphite-containing material.

The solid matter separator unit may include a solid matter separator and fixing apparatus connecting between separator and reactor.

The solid matter separator may contain a plurality of pores having a size of 10 nm to 100 nm.

Advantageous Effects

According to the present invention, it is possible to provide a sediment-type microbial fuel cell which includes a solid matter separator unit placed in such a way that an anode module is exposed to a space containing a liquid-phase material to increase a rate of transfer of organic matter to the anode module, thereby exhibiting improved power output.

In addition, according to the present invention, it is possible to provide a sediment-type microbial fuel cell which can minimize oxygen crossover to an anode module by virtue of the presence of a space containing a liquid-phase material, thereby maintaining performance of the anode module for a long time.

The above and other aspects, features, and advantages of the present invention will become apparent from the detailed description of the following embodiments in conjunction with the accompanying drawings.

DESCRIPTION OF DRAWINGS

FIGS. 2(*a*) and 2(*b*) are schematic views of the sediment-type microbial fuel cell according to the embodiment of the invention and a typical sediment-type microbial fuel cell placed in respective reaction baths;

BEST MODE

Exemplary embodiments of the present invention will now be described in detail with reference to the accompanying drawings.

However, it should be understood that the present invention is not limited to the following embodiments and may be embodied in different ways by those skilled in the art without departing from the scope of the present invention. Further, it should be understood that various modifications and equivalent embodiments may be made by those skilled in the art without departing from the spirit and scope of the present invention.

In the accompanying figures, the size and relative sizes of layers, films, panels, regions, etc., may be exaggerated for clarity and descriptive purposes. In addition, like reference numerals denote like elements.

A sediment-type microbial fuel cell according to the present invention may include: an anode module placed in sediment of a contaminated region of water; a solid matter separator unit placed in the sediment to be disposed above the anode module; and a cathode module placed underwater to be adjacent to a water surface. Here, at least one surface of the anode module may be exposed to a space formed by the solid matter separator unit.

Figure 1:
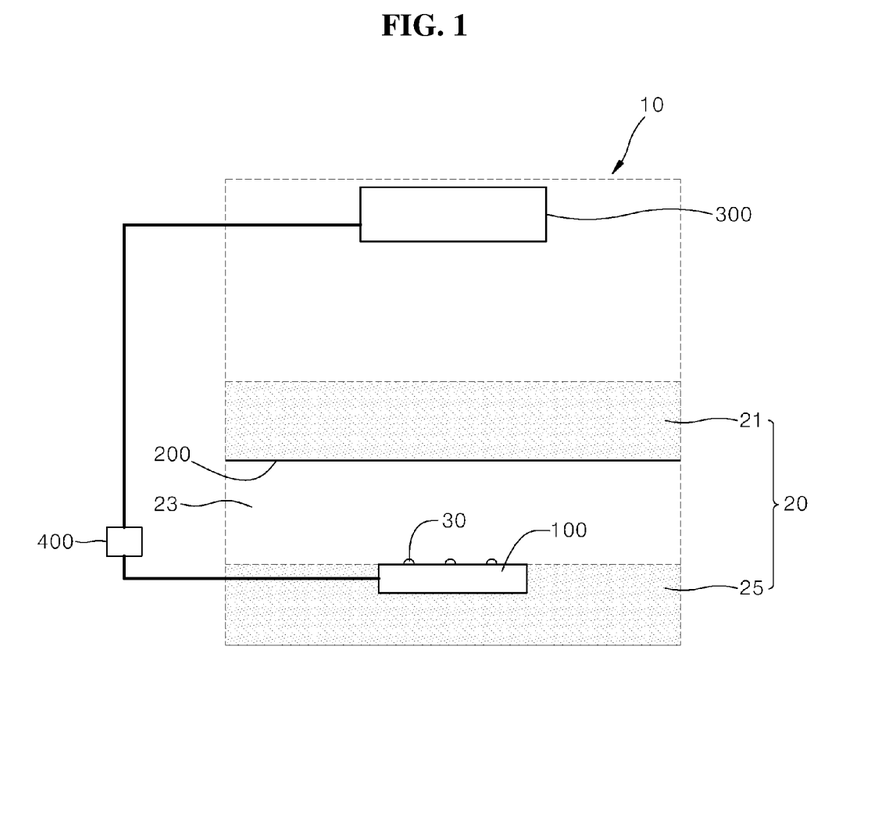
FIG. 1 is a schematic view of a sediment-type microbial fuel cell according to one embodiment of the present invention.

FIG. 1 is a schematic view of a sediment-type microbial fuel cell according to one embodiment of the present invention.

Referring to FIG. 1, a sediment-type microbial fuel cell according to one embodiment of the present invention may include an anode module 100, a solid matter separator unit 200, and a cathode module 300.

The anode module 100 may be placed in sediment 20 in a lower region of a contaminated region of water 10. In other words, the sediment 20 may be located on a bottom of the contaminated region of water 10, and the anode module 100 may be placed in the sediment 20 on the bottom of the contaminated region of water 10. Specifically, among an upper sediment and an lower sediment separated by the solid matter separator unit described below, the anode module 100 may be placed in the lower sediment and at least one surface of the anode module 100 may be exposed above a surface of the lower sediment 25.

The anode module 100 may include an anode and an anode support connected to the anode. The anode support is connected to a portion of the anode to place the anode at a desired position inside the sediment 25 in the contaminated region of water 10. The anode support may be formed of a dielectric material having high corrosion resistance and good mechanical properties. In one embodiment, the anode support may take the form of a fixing element having a thickness or may be attached to a separate fixing element. The anode support may be formed of any suitable dielectric material known in the art, without limitation.

The anode of the anode module 100 may have a plate shape extending in a direction parallel to the surface of the sediment 20. The anode may be formed of a material having suitable mechanical strength and toughness to be used for a long time in the contaminated region of water 10. In addition, the anode may be formed of a material which is chemically stable, nontoxic to microbes, and friendly to microbes.

The anode may be formed of a graphite-containing material. The anode may be any one selected from among a graphite plate, a graphite felt, and a graphite rod, without being limited thereto. The anode may be surface-treated with a metal. This serves to prevent the anode from being damaged due to long-term use in the contaminated region of water 10. As the metal, platinum (Pt), palladium (Pd), or ruthenium (Ru) may be used.

Examples of the contaminated region of water 10 may include a closed natural body of water such as a lake or a pond and an artificial body of water such as a sewage treatment plant or a wastewater treatment plant, without being limited thereto. The contaminated region of water 10 may contain a large amount of organic matter (organic pollutants), wherein the organic matter may be from the sediment and water constituting the contaminated region of water 10.

In the contaminated region of water 10, there may be exoelectrogens, which can easily grow in an anaerobic ecosystem having low oxygen concentration. In other words, the exoelectrogens 30 may be present in the sediment and water constituting the contaminated region of water 10. The exoelectrogens 30 can generate electrons by oxidizing organic matter in cells thereof and transfer the electrons outside the cells. When the exoelectrogens 30 oxidize the organic matter, hydrogen ions and carbon dioxide may be generated.

The exoelectrogens 30 may be microbes used in a generally known microbial fuel cell, and may be, for example, metal-reducing bacteria. The metal-reducing bacteria may be selected from the group consisting of genus *Geobacter* and genus *Shewanella*, without being limited thereto. Electrons extracellularly transferred by the exoelectrogens 30 can be moved to electron transport receptors present outside the cells. The electron transport receptors may be a metal oxide, for example, an oxide of iron (Fe), manganese (Mn), uranium (Ur), or chromium (Cr). In one embodiment, the electron transport receptors may be separately added to the contaminated region of water 10.

The exoelectrogens 30 may be concentrated on a surface of the anode of the anode module 100, such that electrons can be transferred to the anode. Specifically, after the exoelectrogens 30 extracellularly transfer electrons generated by intracellular oxidation of organic matter in the contaminated region of water 10, the transferred electrons reduce the electron transport receptors, such that the reduced electron transport receptors are oxidized on the surface of the anode to transfer electrons to the anode. As such, the electrons transferred to the anode may be transferred to the cathode module 300 which is electrically connected to the anode module 100.

The solid matter separator unit 200 may be placed in the sediment 20 on the bottom of the contaminated region of water 10. Specifically, the solid matter separator unit 200 may be placed in the sediment 20 to be at a certain distance above the anode module 100. Thus, a space 23 can be formed between the anode module 100 and the solid matter separator unit 200.

The solid matter separator unit 200 may include a sediment membrane and a sediment membrane support connected to the sediment membrane. The sediment membrane support is connected to a portion of the sediment membrane and serves to place the sediment membrane at a desired position in the sediment on the bottom of the contaminated region of water 10. The sediment membrane support may be formed of a material having high corrosion resistance and good mechanical properties. The solid matter separator unit may take the form of a fixing element having a certain thickness, or may be attached to a separate fixing element. For example, the solid matter separator unit may include an element for fixation of the separator and a metal ring or adhesive resin for connection of the element, without being limited thereto.

The solid matter separator may be a membrane which transmits or filters materials other than solid-phase materials. Specifically, the solid matter separator may be a membrane which transmits or filters a liquid-phase material contained in the sediment 20 on the bottom of the contaminated region of water 10, for example, water, organic matter dissolved or suspended in water, or a solute composed of various dissolved ions. As such, the solid matter separator allows the liquid-phase material to be present around the anode module to overcome limitation in organic matter transfer such that the organic matter can be easily transferred to the anode of the anode module and oxidized at the anode.

In other words, the sediment membrane serves to allow hydrogen ions generated in the anode module 100 to be transferred to the cathode module 300. In addition, the sediment membrane allows the upper sediment 21 on the sediment membrane to be partially transmitted or filtered such that the liquid-phase material can be present in the space 23.

The solid matter separator may be formed of a physically/chemically stable material to function as a membrane even when placed in the contaminated region of water 10 for a long time. The solid matter separator may be any suitable solid/liquid separator known in the art, without limitation. For example, the solid matter separator may be a cloth needle membrane, specifically a nylon filter cloth, a cotton filter cloth, or a mesh filter cloth. A typical microbial fuel cell has a problem in that an expensive membrane must be used for selective ion transfer. In contrast, in the sediment-type microbial fuel cell according to the present invention, a cheap material having high durability can be used as the solid matter separator, thereby overcoming the shortcomings of a typical microbial fuel cell.

The solid matter separator may contain a plurality of pores having a size of 10 nm to 100 nm. Within this range of pore size, organic matter can be easily moved around the anode module through the plurality of pores.

A liquid-phase material originating from the contaminated region of water 10 may be present in the space 23. Specifically, a solid-phase material and a liquid-phase material constituting the upper sediment 21 are separated from one another by the solid matter separator unit 200 underlying the upper sediment 21, such that the liquid-phase material transmitted or filtered by the solid matter separator unit 200 can be present in the space 23.

Here, at least one surface of the anode module 100 may be exposed in the space 23 formed by the solid matter separator unit 200. Specifically, at least one surface of the anode of the anode module 100 placed in the lower sediment 25 below the space 23 may be exposed in the space 23. In other words, in the space 23, the liquid-phase material originating from the contaminated region of water 10 may be brought into contact with at least one surface of the anode.

As described above, the sediment 20 in the contaminated region of water 10 is divided by the s solid matter separator unit 200 to have a sandwich structure of the lower sediment 25, the space 23, and the upper sediment 21. Since the liquid-phase material is present in the space 23 in the middle of the sandwich structure, as described above, a concentration gradient of organic matter in the sediment may be formed from the upper sediment 21 to the space 23.

Thus, as the organic matter in the upper sediment 21 is diffused into the space 23 containing the liquid-phase material, a mass transfer rate around the anode module 100, at least one surface of which is exposed in the space 23, can be increased. In a typical sediment-type fuel cell, organic matter contained in sediment is slowly diffused around an anode, causing deterioration in electrical properties of the anode. In contrast, the sediment-type microbial fuel cell according to the present invention can increase the mass transfer rate, thereby exhibiting improved power output and current density.

In addition, the space 23 formed above the anode module 100 and containing the liquid-phase material can minimize oxygen crossover to the anode module 100. In a typical sediment-type fuel cell, growth of exoelectrogens 30 is inhibited due to oxygen crossover from a cathode to an anode. In contrast, the sediment-type microbial fuel cell according to the present invention can minimize oxygen crossover to maintain anaerobic conditions, thereby promoting growth of exoelectrogens 30, which are anaerobic bacteria present on and around the surface of the anode module 100.

The cathode module 300 of the sediment-type microbial fuel cell may be placed underwater to be adjacent to the surface of the contaminated region of water 10. Thus, a surface of the cathode module 300 may be partially exposed to an air space outside the contaminated region of water 10.

The cathode module 300 may include a cathode and a cathode support connected to the cathode. The cathode support is connected to a portion of the cathode and serves to place the cathode as close as possible to the surface of the contaminated region of water 10. The cathode support may be formed of a dielectric material having high corrosion resistance and good mechanical properties. In some embodiments, the cathode support may take the form of a fixing element having a certain thickness or may be attached to a separate fixing element. Alternatively, the cathode support may be configured to allow the cathode to float on the surface. The cathode support may be formed of any suitable dielectric material known in the art, without limitation.

The cathode may have a plate shape extending in a direction parallel to the surface of the contaminated region of water 10. Like the anode, the cathode may be formed of a material having suitable mechanical strength and toughness to be used for a long time in the contaminated region of water 10. In addition, the cathode may be formed of a material which is chemically stable, nontoxic to microbes, and friendly to microbes.

The cathode may be formed of a graphite-containing material. The cathode may be any one selected from among a graphite plate, a graphite felt, and a graphite rod, without being limited thereto. The cathode may be surface-treated with a metal. This serves to prevent the cathode from being damaged due to long-term use in the contaminated region of water 10. As the metal, platinum (Pt), palladium (Pd), ruthenium (Ru), or the like may be used.

In the cathode of the cathode module 300, oxygen reduction occurs. Specifically, oxygen in air is dissolved in the surface water of the contaminated region of water 10, and the dissolved oxygen in the contaminated region of water 10 can be reduced to water ($H_2O$) through reaction with hydrogen ions.

The sediment-type microbial fuel cell according to the present invention may further include an electric element for connection between the anode module 100 and the cathode module 300. Electrons generated by oxidation of organic matter contained in the sediment 20 by the exoelectrogens 30 and transferred to the anode module 100 can be moved to the cathode module 300 through the electric element 400, thereby activating the sediment-type microbial fuel cell according to the present invention. The electric element may be formed of a material capable of withstanding underwater conditions, or may be surrounded and protected by the material as set forth above. The electric element 400 may be any suitable electric element known in the art, without limitation.

The sediment-type microbial fuel cell is installed in a contaminated region of water and may further include a separate fixing element for securely fixing the fuel cell to the contaminated region of water. The separate fixing element may be formed of a highly corrosion-resistant and chemically/physically stable material to be used in the contaminated region of water for a long time, and may be any suitable fixing element known in the art.

Mode for Invention

Example

Figure 2A:
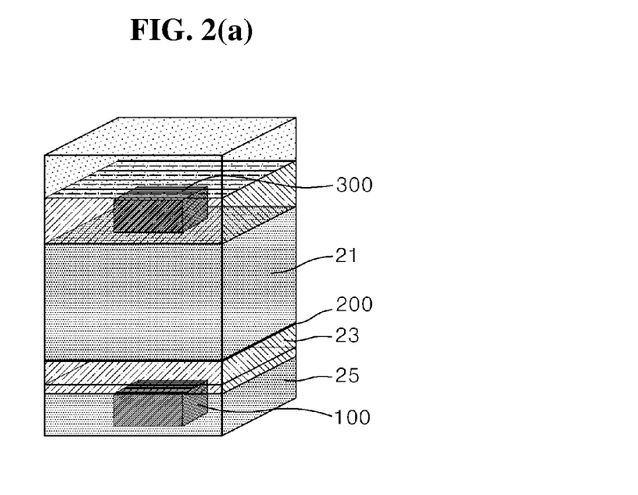
Figure 2B:
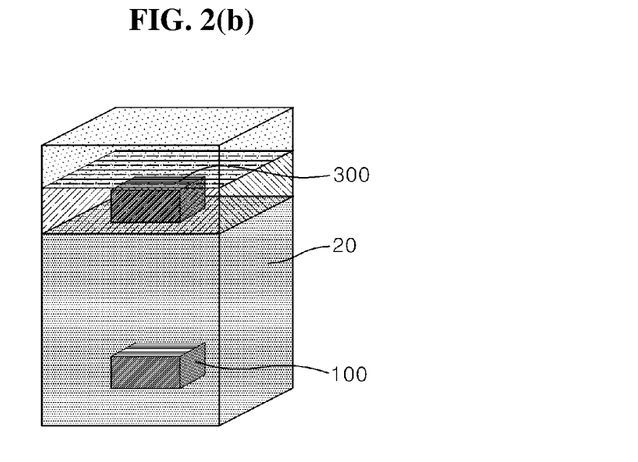

Example: Sediment-type Microbial Fuel Cell Including Solid Matter Separator Unit Example will be described in detail with reference to FIG. 2.

FIGS. 2(a) and 2(b) are schematic views of the sediment-type microbial fuel cell and a typical sediment-type microbial fuel cell placed in respective reaction baths.

Referring to FIG. 2(a), a sediment-containing sample taken from the Yeonggwang Reservoir was physically stirred for 2 hours, and a portion of the sediment accumulated on the bottom of a reaction bath to a thickness of 3 cm. As the anode of the anode module 100, a rigid graphite plate having a size of 1 cm×4 cm×4 cm (thickness×length×width) was placed in the sediment 25. Here, the graphite plate was placed 2 cm above the bottom with the sediment accumulated thereon using a dielectric panel having a certain thickness as an anode support.

As the sediment membrane of the solid matter separator unit 200, a porous cloth needle membrane having a pore size of 50 nm and being permeable to liquid was placed about 2 cm above the anode module 100. Here, the cloth needle membrane was attached to an inner wall of the reaction bath through an adhesive resin applied to an edge of the cloth needle membrane, as the sediment membrane support. Then, water was added to the space 23. A portion of the sediment accumulated on the solid matter separator unit 200 to a thickness of 6 cm, followed by adding water to the top of the sediment 21 to a height of 8 cm.

As the cathode of the cathode module 300, a graphite felt having a size of 2.54 cm×20 cm×20 cm (thickness×length× width) was placed adjacent to the surface of water in the reaction bath using a foamed styrene resin (Styrofoam), as a buoyant cathode support. The anode module 100 was connected to the cathode module 300 through a titanium wire, as the electric element.

Comparative Example: Sediment-type Microbial Fuel Cell Not Including Solid Matter Separator Unit As shown in FIG. 2(b), the anode module 100 and the cathode module 300 were formed of the same materials as in Example and were placed at the same positions as in Example. However, the solid matter separator unit was not provided, and the sediment 20 accumulated on the bottom of a reaction bath to a thickness of 11 cm. The anode module 100 placed in the sediment 20 was electrically connected to the cathode module 300 placed adjacent to the surface of water using an electrical element.

Figure 3:
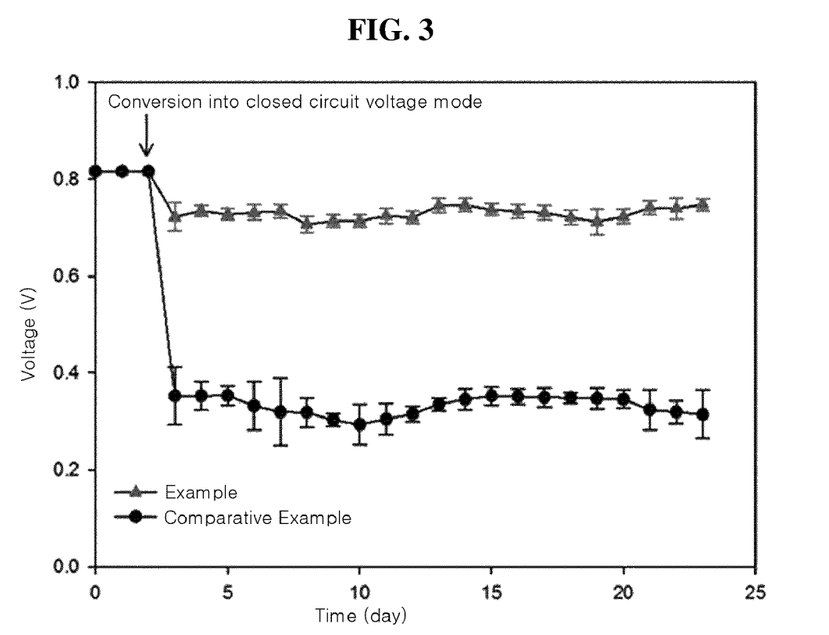
FIG. 3 is a graph depicting voltage change over time, as measured on sediment-type microbial fuel cells of Example and Comparative Example upon conversion into a closed circuit voltage mode.

FIG. 3 is a graph depicting voltage change over time, as measured on the sediment-type microbial fuel cells of Example and Comparative Example upon conversion into a closed circuit voltage mode.

Referring to FIG. 3, it can be seen that the voltage of the sediment-type microbial fuel cell of Comparative Example was significantly decreased and maintained at a low level upon conversion into a closed circuit voltage mode of 5 kΩ after 3 days. Conversely, the voltage of the sediment-type microbial fuel cell of Example was slightly decreased by about 0.1 V and maintained at a relatively high level over time upon conversion into a closed circuit voltage mode of 5 kΩ after 3 days. In other words, it was confirmed that the voltage of the sediment-type microbial fuel cell of Example including the solid matter separator unit was consistently maintained at a high level even in a closed circuit voltage mode. In addition, it was confirmed than the voltage of the sediment-type microbial fuel cell of Example was consistently maintained at a high level even after 20 days or more. Thus, it can be seen that the sediment-type microbial fuel cell according to the present invention is operable for a long time in a contaminated region of water.

Figure 4:
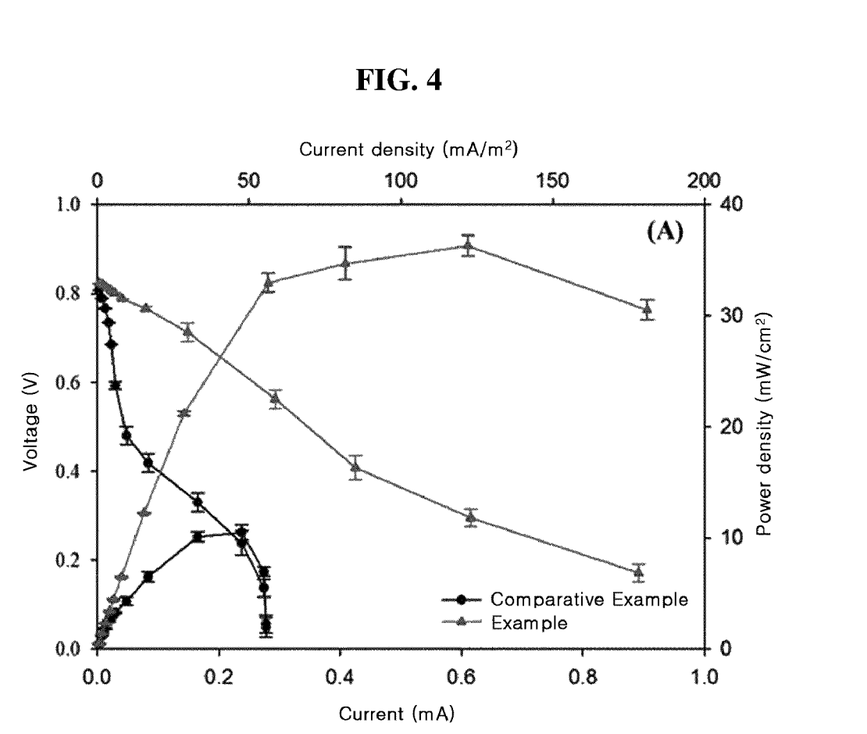
FIG. 4 is a graph depicting performance of the sediment-type microbial fuel cells of Example and Comparative Example, as measured upon conversion into an open circuit voltage mode.

FIG. 4 is a graph depicting performance of the sediment-type microbial fuel cells of Example and Comparative Example, as measured upon conversion into an open circuit voltage mode.

Referring to FIG. 4, both of the sediment-type microbial fuel cells had a voltage of about 0.8 V, as measured at an early stage after conversion into an open circuit voltage mode. After that, the voltage of the sediment-type microbial fuel cell of Comparative Example was significantly decreased, and the current of the fuel cell was slightly increased and then decreased soon, causing deterioration in fuel cell performance. Conversely, the current density of the sediment-type microbial fuel cell of Example was significantly increased and maintained at a high level. Thus, it can be seen that the performance of the sediment-type microbial fuel cell of Example can be consistently maintained. Therefore, it can be ascertained that the sediment-type microbial fuel cell including the solid matter separator unit according to the present invention can provide consistent performance regardless of fluidity of organic matter when installed in a real contaminated region of water having fluidity (flow of a fluid and the like).

Figure 5:
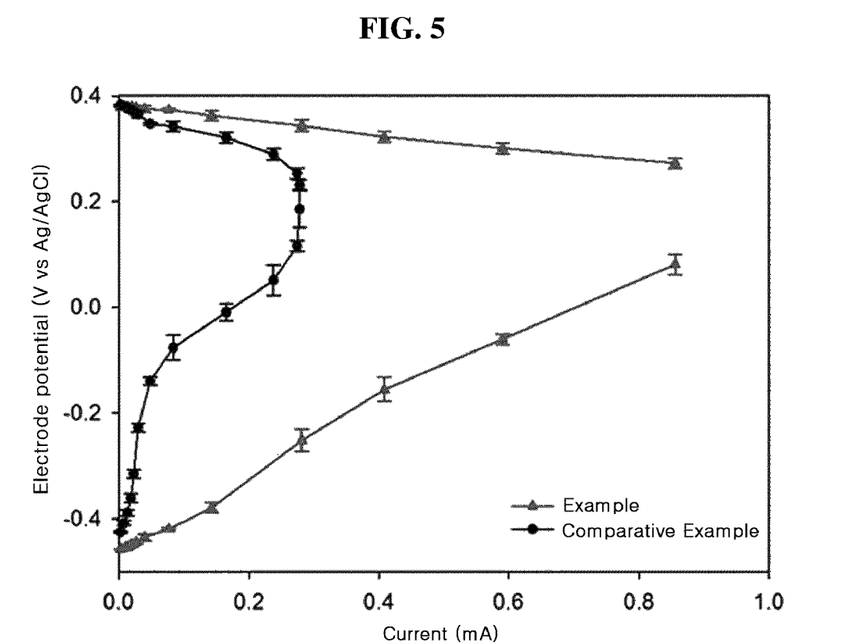
FIG. 5 is a graph depicting electrode potentials of the sediment-type microbial fuel cells of Example and Comparative Example.

FIG. 5 is a graph depicting electrode potentials of the sediment-type microbial fuel cells of Example and Comparative Example.

Referring to FIG. 5, it can be seen that the sediment-type microbial fuel cell of Example had higher current than the sediment-type microbial fuel cell of Comparative Example, and the voltage of the fuel cell of Example was slightly decreased in a consistent manner This means that, for a given current value, the voltage of the sediment-type microbial fuel cell of Example can be more easily maintained at a consistent level.

As described with reference to FIGS. 3 to 5, it can be seen that the sediment-type microbial fuel cell including the solid matter separator unit according to the present invention can exhibit improved current density and power output. This is because a rate of organic matter transfer to an electrode is increased due to the presence of the solid matter separator unit.

As such, the sediment-type microbial fuel cell including the solid matter separator unit can increase a rate of diffusion of organic matter by virtue of the sandwich structure formed by the solid matter separator unit, thereby providing improved performance.

Figure 6:
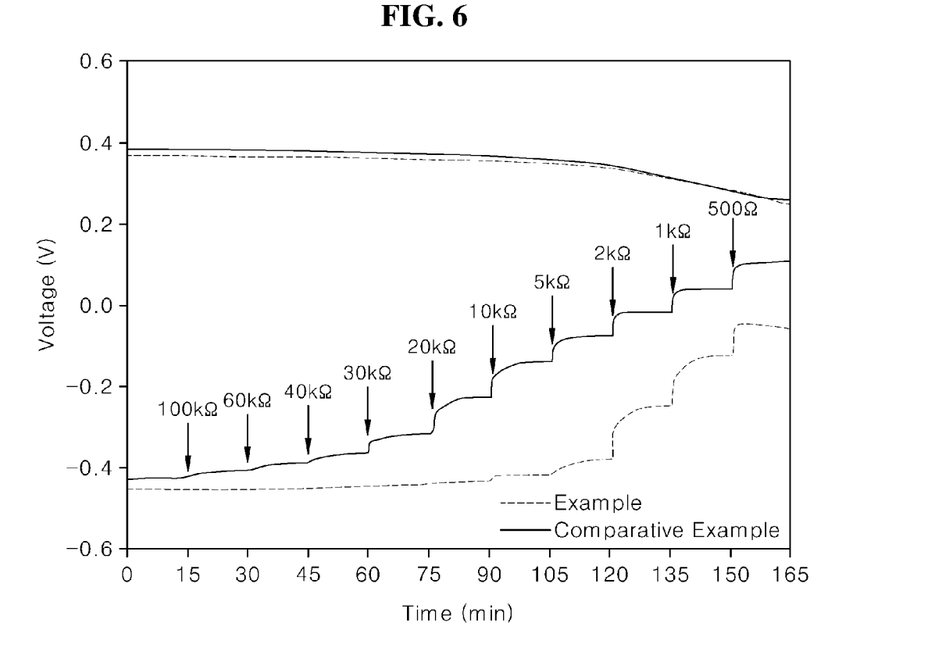
FIG. 6 is a graph depicting voltage change depending upon external resistance, as measured on the sediment-type microbial fuel cells of Example and Comparative Example.

FIG. 6 is a graph depicting voltage change depending upon external resistance, as measured on the sediment-type microbial fuel cells of Example and Comparative Example.

Change in voltage over time of each of the sediment-type microbial fuel cells was measured while gradationally varying external resistance from 100 kΩ to 500Ω. Referring to FIG. 6, the voltage of the anode of the sediment-type microbial fuel cell of Comparative Example was not significantly changed under an external resistance from 100 kΩ to 40Ω and was gradually increased under an external resistance from 30 kΩ to 5 kΩ.

Conversely, the voltage of the anode of the sediment-type microbial fuel cell of Example was maintained at a consistent level under an external resistance from 30 kΩ to 5 kΩ. Then, the voltage of the anode of the fuel cell was temporarily increased and soon decreased again under an external resistance from 2 kΩ to 500 kΩ. As described above, since a concentration gradient of organic matter is formed around the anode module due to the sandwich structure formed by the solid matter separator unit, an electron transfer rate can be increased, whereby demand for electrons by the cathode module can be satisfied even upon change of external resistance.

Table 1 shows results of measuring internal resistance of each of the sediment-type microbial fuel cells of Example and Comparative Example by impedance spectroscopy.

TABLE 1

| | Internal resistance (Ω) | | |
|---|---|---|---|
| | Water-sediment interface to anode | Cathode to water-sediment interface | Total internal resistance |
| SMFC-woFB | 171 ± 0.3 | 35.8 ± 0.03 | 207 ± 0.7 |
| SMFC-wFB | 192 ± 0.7 | 35.8 ± 0.01 | 228 ± 0.1 |

Referring to Table 1, it can be seen that the sediment-type microbial fuel cell of Example had higher resistance than the sediment-type microbial fuel cell of Comparative Example, as measured at the anode and an interface between water and sediment. In addition, it can be seen that the sediment-type microbial fuel cell of Example had a flow rate of organic matter 10 times higher than that of the sediment-type microbial fuel cell of Comparative Example, as measured in the vicinity of the anode module. As described above, a higher flow rate of organic matter indicates more enriched organic matter in the vicinity of the anode module. Thus, the anode module can provide improved performance. In other words, the sediment-type microbial fuel cell including the solid matter separator unit according to the present invention can compensate for increase in overvoltage of the anode module due to the effects as described above.

Figure 7:
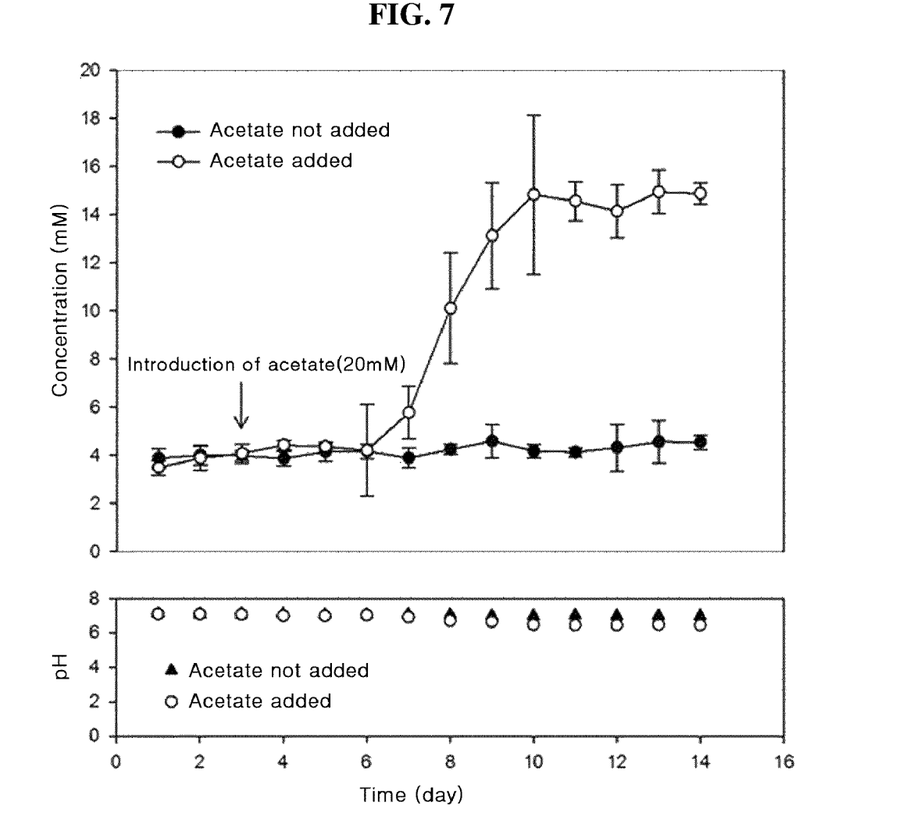
FIG. 7 is a graph depicting changes in organic matter concentration over time of the sediment-type microbial fuel cell of Example, as measured when acetate was introduced or not introduced into a water-sediment interface.

FIG. 7 is a graph depicting changes in organic matter concentration over time of the sediment-type microbial fuel cell of Example, as measured when acetate was introduced or not introduced to a water-sediment interface.

Referring to FIG. 7, it can be seen that the organic matter concentration of the sediment-type microbial fuel cell into which acetate was not introduced was consistently maintained at a level of about 4 mg. Conversely, it can be seen that the organic matter concentration of the sediment-type microbial fuel cell with acetate introduced thereinto started to increase on the $3^{rd}$ day after introduction of acetate (i.e. the $6^{th}$ day after fabrication of the sediment-type microbial fuel cell) and reached about 15 mg on the 10th day after fabrication of the sediment-type microbial fuel cell. This is because concentration of acetate was increased as organic matter was diffused for 4 days from the $6^{th}$ day to the $10^{th}$ day.

In addition, it can be seen that a value of pH around the anode module measured for the same period of time was maintained at a constant level regardless of introduction of acetate, such that a stable environment could be formed. Therefore, it can be seen that the sediment-type microbial fuel cell according to the present invention can allow organic matter to be stored in sediment and allow the organic matter to be effectively dissolved in a contaminated region of water. As such, the sediment-type microbial fuel cell according to the present invention can be effectively used even in a contaminated region of water having a high organic contamination level. For example, the sediment-type microbial fuel cell according to the present invention may be used as an apparatus for monitoring water quality of a contaminated region of water since the fuel cell allows organic matter to be effectively dissolved in sediment.

Although some embodiments have been described with reference to the drawings, it should be understood that the present invention is not limited to these embodiments, and that various modifications, changes, and alterations can be made without departing from the spirit and scope of the invention.

The invention claimed is:

1. A sediment-type microbial fuel cell, comprising:
   a reactor containing contaminated water including sediment and a liquid phase-material,
   a solid matter separator unit in the reactor, separating the sediment to an upper sediment having an upper space on the upper sediment and a lower sediment having an lower space on the lower sediment, and the solid matter separator is configured to pass hydrogen ions;
   an anode module disposed in the lower sediment of contaminated water, having at least on side exposed in the lower space in which liquid-phase material is present,
   exoelectrogens on a surface of the anode that generate hydrogen ions by oxidation of organic matter present in the liquid phase material, so that electron is transferred to the anode; and
   a cathode module placed in the upper space in which the liquid-phase material is present, and adjacent to the contaminated water surface,
   wherein the hydrogen ions passed through the solid matter separator from the lower space react with oxygen dissolved in the contaminated water from air to generate water,
   wherein the solid matter separator unit is configured to diffuse the organic matter in the liquid-phase material in the upper space or the liquid-phase material of the upper sediment into the lower space. and the dissolved oxygen is prevented from diffusing into the anode module,
   wherein the exposed side of the anode module is in contact with the liquid-phase material in the lower space.

2. The sediment-type microbial fuel cell according to claim 1, a concentration gradient of organic matter is generated in the liquid-phase material from the upper sediment to the lower space.

3. The sediment-type microbial fuel cell according to claim 1, wherein the anode module comprises an anode and an anode support connected to the anode.

4. The sediment-type microbial fuel cell according to claim 1, wherein the cathode module comprises a cathode and a cathode support connected to the cathode.

5. The sediment-type microbial fuel cell according to claim 1, wherein each of the anode and the cathode is formed of a graphite-containing material.

6. The sediment-type microbial fuel cell according to claim 1, wherein the solid matter separator unit comprises a solid matter separator and a fixing apparatus connecting between the solid matter separator and the reactor.

7. The sediment-type microbial fuel cell according to claim 6, wherein the solid matter separator contains a plurality of pores having a size of 10 nm to 100 nm.

* * * * *